Oct. 12, 1926.
J. F. BOWERMAN
1,602,518
BATTERY TESTING DEVICE
Filed July 22, 1925
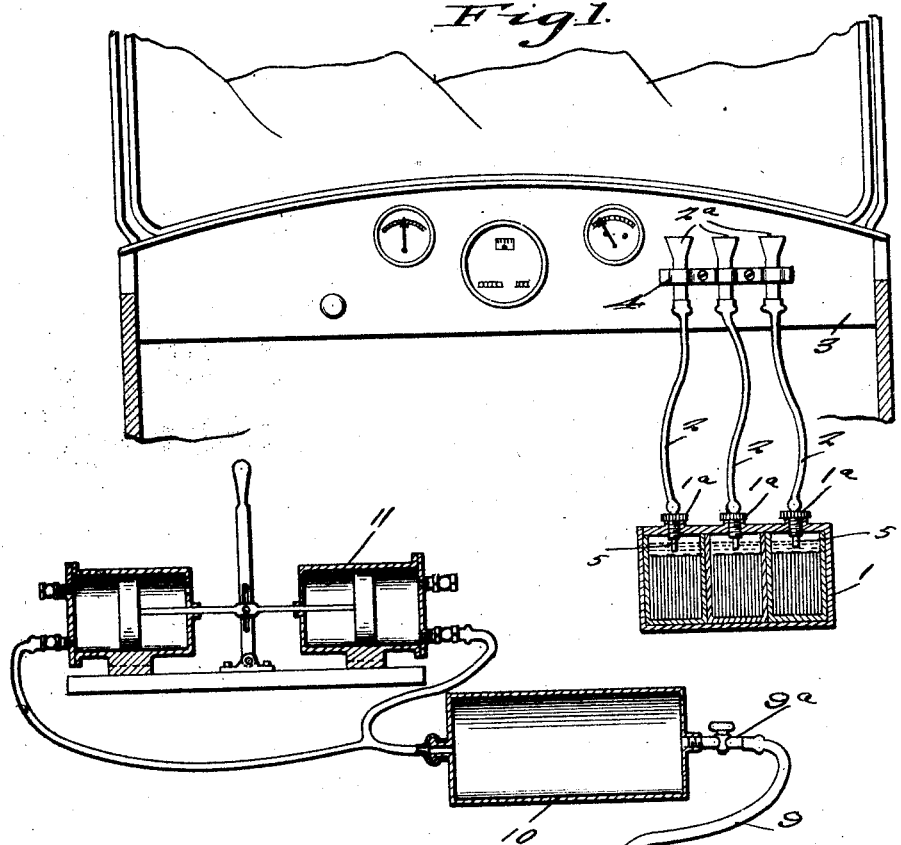
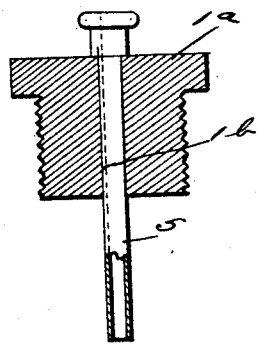
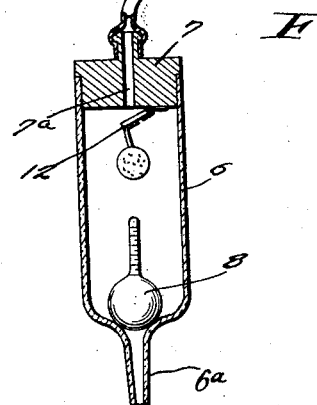
Inventor
James F. Bowerman
By *Spear Middleton Donaldson & Hall*
Attorney Patented Oct. 12, 1926.

1,602,518

UNITED STATES PATENT OFFICE.

JAMES FRASER BOWERMAN, OF JACKSON, MICHIGAN.

BATTERY-TESTING DEVICE.

Application filed July 22, 1925. Serial No. 45,398.

My present invention relates to improvements in battery testing devices designed for testing specific gravity of the electrolyte and also for determining whether or not water is present in the battery, being designed more specifically for use in testing the batteries of automobiles where they are carried beneath the floor boards and hence accessible only with difficulty.

The invention aims to provide means by which the battery may be readily tested by an attendant at a service station without disturbing the floor boards and causing the occupants of the car unnecessary delay and inconvenience.

With these and other objects in view, the invention includes the novel construction hereinafter described and defined by the appended claims.

An embodiment of my invention is illustrated in the accompanying drawings, in which:—

Figure 1 is a conventional view of a sufficient portion of an automobile to illustrate how my invention is used, and Fig. 2 is a view of the portable device used in connection with the parts shown in Fig. 1.

Fig. 3 is a sectional detail of one of the cell plugs.

In this drawing, the numeral 1 indicates the battery shown conventionally as the ordinary three-cell battery. 2 designates tubes which lead through the floor boards of the car and are connected at their lower ends to the filling plugs 1ª of the battery, their upper ends being flared, as indicated at 2ª and being secured to the body part 3 in convenient position by means such as a clipbar 4. The lower ends of the tubes may be connected to the cells by means of nipples 5 inserted through holes 1ᵇ drilled in the plugs, the lower ends of the nipples terminating just above the battery plates. 6 designates a portable transparent testing device having a tapered lower end 6ª adapted to be inserted in any one of the flared upper ends or nozzles 2ª of the pipes or tubes 2. Vessel 6 has an open upper end which is adapted to receive a closure plug 7 with a fluid tight fit, which closure plug is provided with a port 7ª designed to have suction applied thereto. If the nozzle 6ª is inserted in the funnel shaped end 2ª of one of the pipes 2 and suction exerted through the port 7ª, if there be electrolyte in the corresponding cell it will be drawn up into the transparent container 6 and its presence therein will indicate that the battery has sufficient water, while if the electrolyte is below the end of the nipple 5 no electrolyte will be drawn up, whereupon the attendant may supply the necessary liquid by pouring it into the funnel shaped end 2ª. Each cell may be tested in this manner.

By inserting a hydrometer in the testing vessel 6, as indicated at 8, the specific gravity of the electrolyte may be tested. I prefer to apply suction through a flexible pipe 9 connected to a vacuum tank 10, the air from which may be exhausted by a pump 11, a stop cock being provided for turning on and cutting off the suction, as indicated at 9ª. In order to prevent the electrolyte from being drawn up into the pipe 9 and vacuum tank 10 by carelessness of the operator, I provide the plug 7 with a float operated valve 12 which will close after the electrolyte has risen in the testing vessel 6 to the height of the float.

In practice the operator would turn on suction and as soon as the electrolyte has risen to the desired height would cut off the suction by valve 9ª. Of course, as soon as nozzle 6ª is lifted slightly from tube end 2ª, the electrolyte would flow back into the battery, due to air being admitted to the said end 2ª.

Having thus described my invention, what I claim is:—

1. The combination with a battery having separate inlet pipes connected to the individual cells and provided with flared upper ends, of a portable transparent testing receptacle having a tapered nozzle adapted to be readily connected with any one of said pipes with a fluid tight connection, and means for producing a vacuum in said testing chamber.

2. The apparatus of claim 1, in which the testing vessel is adapted for connection by a flexible pipe with a vacuum tank, and float operated means is provided for automatically cutting off the suction when the electrolyte has risen in the testing vessel to a determined distance.

In testimony whereof, I affix my signature.

JAMES FRASER BOWERMAN.